United States Patent Office 2,763,566
Patented Sept. 18, 1956

2,763,566

BENZAL-α-METHYL-α-PHENYLHYDRAZONES AND DERIVATIVES AS ULTRAVIOLET ABSORBERS

James A. Van Allan, Rochester, N. Y., assignor to Eastman Kodak Company, Rochester, N. Y., a corporation of New Jersey No Drawing. Application February 19, 1954, Serial No. 411,587

20 Claims. (Cl. 117—33.3)

This invention relates to materials which are ultraviolet absorbers and to their use in the fabrication of light filters, light protective wrappings, organic plastic materials and the like. More particularly, this invention relates to benzal-α-methyl-α-phenylhydrazones.

It is well known that many organic substances are affected by the action of ultraviolet light. For instance, various colored objects, textiles and dyed substances will fade when exposed to long periods of sunlight. This appears to be particularly true of colored articles having relatively thin cross sections such as colored photographic prints, transparencies, dyed organic fibers and the like.

It is known that organic plastics, resins, film-forming materials and the like become colored, brittle and eventually deteriorate when exposed to sunlight. In order to vitiate the deleterious and damaging effect of sunlight upon plastics and other materials, incorporation of stabilizers such as, for example, 4-benzoyl resorcinol (U. S. Patent No. 2,568,894) and the like, have been suggested by the prior art. However, while many of these compounds are excellent ultraviolet absorbers, their absorption characteristics may change considerably when the pH is on the alkaline side. In some instances, films containing certain ultraviolet inhibitors have a definite yellow color when the pH is greater than 8. Furthermore, some of these compounds lose a great portion of their light stability with an alkaline pH. In addition, some of these inhibitors are known to be very active couplers which makes them unsuitable for many photographic purposes.

I have found that benzal-α-methyl-α-phenylhydrazones are effective as ultraviolet absorbers when incorporated in surface coatings and photographic material or when used in such plastic materials as polyvinyl chloride, cellulose acetate butyrate and the like.

Accordingly, an object of this invention is to provide a light filter capable of substantial absorption in the region of the near ultraviolet. Another object is to provide a light filter having a substantially complete and preferential absorption of light within the wavelength band of 3000–4000 A. Another object of this invention is to provide new compositions of matter which are polymeric compounds having benzal-α-methyl-α-phenylhydrazone or a derivative incorporated therein to protect these polymers from breakdown and color fading due to ultraviolet light. A further object of this invention is to provide an ultraviolet inhibitor which is independent of pH for stability, remains substantially waterwhite after ultraviolet absorption and is compatible with photographic applications.

I have found that benzal-α-methyl-α-phenylhydrazone fulfills the requirements for a satisfactory and successful ultraviolet inhibitor for use in a great variety of applications. The hydrazones which I have found to be preferred for ultraviolet inhibitors include the following:

4'-isopropylbenzal-α-methyl-α-phenylhydrazone
4'-butoxybenzal-α-methyl-α-phenylhydrazone
4'-hydroxybenzal-α-methyl-α-phenylhydrazone
2',6'-di-tert.-butyl-4-hydroxybenzal-α-methyl-α-phenylhydrazone
2',4'-dichlorobenzal-α-methyl-α-phenylhydrazone
3,4'-dichlorobenzal-α-methyl-α-phenylhydrazone
4-β-Hydroxyethoxybenzal-α-methyl-α-phenylhydrazone
o-Methoxybenzal-α-methyl-α-phenylhydrazone
4'-chlorobenzal-α-methyl-α-phenylhydrazone
2-chlorobenzal-α-methyl-α-phenylhydrazone
2,6-dichlorobenzal-α-methyl-α-phenylhydrazone In general, compounds having the hydrazone configuration cannot be depended upon to be stable, and compounds similar to those that I have found useful in this invention are notably unstable, particularly upon exposure to ultraviolet light. For instance, benzophenone phenylhydrazone is unstable and breaks down upon standing overnight in a dark place, resulting in the formation of a strong yellow color. Benzalphenylhydrazone which may be regarded as the parent compound, is extremely light-sensitive and is quickly decomposed by the action of light into a mixture of dark colored degradation products, among them β-benzoylphenylhydrazone, benzaldehyde, benzoic acid, etc. In sharp contrast, a representative α-methyl derivative, o-methoxybenzal-α-methyl-α-phenylhydrazone showed no ultraviolet fading when exposed in gelatin to normal radiation over a period of several weeks.

The ultraviolet absorbing capacity, the stability, and the absence of unwanted side reactions, have been particularly marked in the tests with polyvinyl chloride and butadiene copolymers. When used with cellulose acetate butyrate under outdoor weathering conditions in Arizona, they have shown good absorbing properties.

The following table illustrates but is not intended to limit the practice of this invention with respect to the use of these compositions in polymeric materials:

| Name | Parts per 100 Polymer | Bending Modulus, kgm/sq. cm. | |
|---|---|---|---|
| | | 24 hr. | 48 hr. |
| 4'-isopropylbenzal-α-methyl-α-phenylhydrazone. | 4 | 660 | 565 |
| 4'-butoxybenzal-α-methyl-α-phenylhydrazone. | 4 | 505 | 615 |
| 4'-hydroxybenzal-α-methyl-α-phenylhydrazone. | 4 | 940 | 765 |
| 2,4-dichlorobenzal-α-methyl-α-phenylhydrazone. | 4 | 475 | 720 |
| 3,4-dichlorobenzal-α-methyl-α-phenylhydrazone. | 4 | 570 | 800 |
| 4-chlorobenzal-α-methyl-α-phenylhydrazone. | 4 | 310 | 820 |
| Control | (no absorber) | 2,980 | 10,200 |

These compositions were also tested for stability in gelatin. One gram of the α-methyl-α-phenylhydrazone was dissolved in 2 cc. dibutylphthalate and this solution mixed in 20 cc. 10% gelatin solution at 40° C. The mixture was passed through a colloid mill, and the resulting fine dispersion was coated on gelatin subbed glass plates at 40° C., chilled to set, and dried. Substantially complete and preferential absorption of light within the wavelength band of 3000–4000 A. was observed.

In the above table the polymer is composed as follows:

50 parts polyvinyl chloride
50 parts polymeric plasticizer (such as Paraplex G–60)
2 parts antioxidant (such as Ferro 200)
2 parts advanced resin stabilizer #3
2 parts acrowax C (ethylene distearamide)
    (parts are by weight)

Paraplex G–60 is a polymerized ester of a high molecular weight, unsaturated hydroxy acid and a low molecular weight alcohol. Ferro 200 is cadmium 2-ethylhexoate. Advanced-Stabilizer No. 3 is an organic tin polymer.

One hundred parts by weight of this polymeric composition were used with 4 parts of a derivative of benzal-α-methyl-α-phenylhydrazone.

The bending modulus was determined according to the method described by Newton and Wake, Rubber Chemistry and Technology, volume 24, 1–17 (1951).

I claim:

1. An ultraviolet radiation absorbing composition of matter comprising a sheet of light transmitting plastic material having incorporated therein an ultraviolet absorbing amount of benzal-α-methyl-α-phenylhydrazone.

2. An organic polymeric composition containing a material selected from the class consisting of polyvinyl chloride, butadiene, and cellulose acetate butyrate having incorporated therein about 4% of a derivative of benzal-α-methyl-α-phenylhydrazone.

3. A photographic print having a light transmitting coating thereon containing a derivative of benzal-α-methyl-α-phenylhydrazone.

4. A process for protecting a photographic print from ultraviolet deterioration comprising depositing a benzal derivative of α-methyl-α-phenylhydrazone in a suitable carrier upon a surface of the print.

5. A process for protecting an organic polymeric composition containing a material selected from the class consisting of polyvinyl chloride, butadiene, and cellulose acetate butyrate from ultraviolet deterioration comprising adding about 4% of a benzal derivative of α-methyl-α-phenylhydrazone to the organic polymeric composition.

6. A process for protecting organic polymeric composition containing a material selected from the class consisting of polyvinyl chloride, butadiene, and cellulose acetate butyrate from ultraviolet deterioration comprising coating the material with a lacquer containing a benzal derivative of α-methyl-α-phenylhydrazone in a carrier onto the polymeric material.

7. A process for protecting a polyvinyl chloride comprising molecularly dispersing in the polyvinyl chloride a benzal derivative of α-methyl-α-phenylhydrazone.

8. A process for protecting butadiene copolymers comprising molecularly dispersing in the polyvinyl chloride about 4% of a benzal derivative of α-methyl-α-phenylhydrazone.

9. A product according to claim 2 wherein the hydrazone derivative is 4'-isopropylbenzal-α-methyl-α-phenylhydrazone.

10. A product according to claim 2 wherein the hydrazone derivative is 4'-butoxybenzal-α-methyl-α-phenylhydrazone.

11. A product according to claim 2 wherein the hydrazone derivative is 4'-hydroxybenzal-α-methyl-α-phenylhydrazone.

12. A product according to claim 2 wherein the hydrazone derivative is 2,4-dichlorobenzal-α-methyl-α-phenylhydrazone.

13. A product according to claim 2 wherein the hydrazone derivative is 3,4-dichlorobenzal-α-methyl-α-phenylhydrazone.

14. A product according to claim 2 wherein the hydrazone derivative is 4-chlorobenzal-α-methyl-α-phenylhydrazone.

15. A process according to claim 5 wherein the hydrazone derivative is 4'-isopropylbenzal-α-methyl-α-phenylhydrazone.

16. A process according to claim 5 wherein the hydrazone derivative is 4'-butoxybenzal-α-methyl-α-phenylhydrazone.

17. A process according to claim 5 wherein the hydrazone derivative is 4'-hydroxybenzal-α-methyl-α-phenylhydrazone.

18. A process according to claim 5 wherein the hydrazone derivative is 2,4-dichlorobenzal-α-methyl-α-phenylhydrazone.

19. A process according to claim 5 wherein the hydrazone derivative is 3,4-dichlorobenzal-α-methyl-α-phenylhydrazone.

20. A process according to claim 5 wherein the hydrazone derivative is 4-chlorobenzal-α-methyl-α-phenylhydrazone.

References Cited in the file of this patent
UNITED STATES PATENTS

| | | |
|---|---|---|
| 2,129,132 | Hunter | Sept. 6, 1938 |
| 2,241,239 | Carroll et al. | May 6, 1941 |